United States Patent
Sistrunk et al.

(10) Patent No.: US 10,143,224 B2
(45) Date of Patent: Dec. 4, 2018

(54) LOW PROTEIN YOGURTS CONTAINING MODIFIED STARCHES

(71) Applicant: CORN PRODUCTS DEVELOPMENT, INC., Jabaquara, Sao Paulo (BR)

(72) Inventors: Callen Sistrunk, Placentia, CA (US); Valerie Jezequel, Les Clayes-sous-Bois (FR); Judith Vaz, Piscataway, NJ (US); Florian Much, Steinburg (DE); Hanna Clune, Califon, NJ (US); Erhan Yildiz, Whitehouse Station, NJ (US); Douglas Hanchett, Long Valley, NJ (US); Niketa Lad, Parsippany, NJ (US)

(73) Assignee: Corn Products Development, Inc., Westchester, IL (US)

( * ) Notice: Subject to any disclaimer, the term of this patent is extended or adjusted under 35 U.S.C. 154(b) by 232 days.

(21) Appl. No.: 15/194,123

(22) Filed: Jun. 27, 2016

(65) Prior Publication Data

US 2017/0020150 A1     Jan. 26, 2017

Related U.S. Application Data

(60) Provisional application No. 62/196,381, filed on Jul. 24, 2015.

(51) Int. Cl.
| | |
|---|---|
| *A23L 29/219* | (2016.01) |
| *A23C 9/137* | (2006.01) |
| *C08B 31/00* | (2006.01) |
| *C08B 31/06* | (2006.01) |

(52) U.S. Cl.
CPC ............ *A23L 29/219* (2016.08); *A23C 9/137* (2013.01); *C08B 31/003* (2013.01); *C08B 31/066* (2013.01); *A23V 2002/00* (2013.01)

(58) Field of Classification Search
CPC ............................. A23L 29/219; A23C 9/137
USPC .................................. 426/34, 580, 583, 654
See application file for complete search history.

(56) References Cited

U.S. PATENT DOCUMENTS

| | | |
|---|---|---|
| 2,801,242 A | 7/1957 | Kerr et al. |
| 2,884,413 A | 4/1959 | Kerr et al. |
| 2,935,510 A | 5/1960 | Wurzburg |
| 2,938,901 A | 5/1960 | Kerr et al. |
| 3,021,222 A | 2/1962 | Kerr et al. |
| 3,839,320 A | 10/1974 | Bauer |
| 4,219,646 A | 8/1980 | Rubens |
| 6,093,439 A | 7/2000 | Whaley et al. |
| 6,235,320 B1 | 5/2001 | Daravingas et al. |
| 6,749,880 B1 | 6/2004 | Woltjes et al. |
| 6,899,913 B1 | 5/2005 | Buwalda et al. |
| 8,481,717 B2 | 7/2013 | Trksak |
| 9,828,440 B2 | 11/2017 | Shah |
| 2003/0180430 A1 | 9/2003 | Fryirs |
| 2006/0025381 A1* | 2/2006 | Brown et al. |
| 2006/0172055 A1 | 8/2006 | Fryirs |
| 2013/0236624 A1 | 9/2013 | Trksak et al. |
| 2015/0201653 A1 | 7/2015 | Yildiz et al. |

FOREIGN PATENT DOCUMENTS

| | | |
|---|---|---|
| CN | 103232549 | 9/2013 |
| CN | 103819697 | 5/2014 |
| GB | 1218255 | 1/1971 |
| GB | 1220694 | 1/1971 |
| GB | 1409769 | 10/1975 |

OTHER PUBLICATIONS

Shao-Kai He, et al. Food Science & Technology, Difference in the properties among the Hydroxypropyl distrach . . . vol. 39, No. 11, 2014, pp. 274.

* cited by examiner

*Primary Examiner* — Helen F Heggestad
(74) *Attorney, Agent, or Firm* — Jacqueline Cohen; Jason Grauch

(57) ABSTRACT

A low protein yogurt composition is provided comprising water, at least one dairy ingredient and a crosslinked waxy starch, wherein the crosslinked waxy starch is crosslinked with phosphate groups and has a peak Brabender viscosity of from about 600 to about 1500 Brabender units, and the cross-linked waxy starch is present in an amount sufficient to add viscosity to the yogurt. The crosslinked waxy starch can also be stabilized by acetylation to obtain longer shelf life.

9 Claims, No Drawings

LOW PROTEIN YOGURTS CONTAINING MODIFIED STARCHES

CROSS REFERENCE TO RELATED APPLICATIONS

This application claims the benefit of U.S. Application No. 62/196,381 filed 24 Jul. 2015.

BACKGROUND OF THE INVENTION

Field of the Invention

The present invention relates to yogurts containing reduced levels of protein. More particularly, the present invention is directed towards yogurts having reduced protein levels (and thus reduced cost to manufacture) supplemented with a starch based texturizer that enables the yogurt to retain its texture characteristics (e.g., viscosity) and stability (e.g., against syneresis after seven weeks of storage) comparable to full protein yogurt products.

Yogurt is a nutritious dairy product which has become quite popular within the last 30 to 40 years. Yogurt is produced by culturing a dairy ingredient (cream, milk, partially skimmed milk, skim milk or combinations thereof) with a bacterial culture containing the lactic acid producing bacteria *Lactobacillus bulgaricus* and *Streptococcus thermaphilus*. Other cultures can also be used in addition to these two.

Yogurt can optionally contain other ingredients such as vitamins (e.g., vitamin A and/or D), as well as ingredients to increase the nonfat solids content of the yogurt such as concentrated skim milk, nonfat dry milk, buttermilk, whey, lactose, lactalbumins, lactoglobulins and/or other milk solids. Other optional ingredients include sweeteners, flavoring ingredients, color additives and stabilizers.

Yogurt is available in a wide assortment of textures, fat content and flavors, among other attributes. For example, yogurt contains, before the addition of bulky flavors, not less than 3.25% milkfat, and not less than 8.25% milk solids-not-fat. Low-fat yogurt contains from 0.5% to no more than 2% milkfat before the addition of bulky flavors, and nonfat yogurt contains less than 0.5% milkfat before the addition of bulky flavors. These amounts can vary depending upon local regulations.

Yogurts generally fall into one of three styles, namely, Balkan-style or set-style yogurts, Swiss-style or stirred yogurts, and Greek-style or Mediterranean (strained) yogurts. Set-style yogurts are made by pouring the warm cultured milk mixture into containers and then incubating the mixture without any further stirring. Set-style yogurts have a characteristically thick texture. Stirred yogurts are made by incubating warm cultured milk mixture in a vat, cooling the mixture, and then stirring the cooled mixture for a creamy texture, often with fruit, fruit preparations or other flavorings added. Stirred yogurts are often slightly thinner than set-style yogurts. Greek-style or Mediterranean yogurt is made by either removing some of the water from the milk or by straining whey from plain yogurt to make it thicker and creamier.

The gel structure of set-style yogurts results from an acid-casein interaction, wherein casein (protein) micelles at or near their isoelectric point flocculate, and the colloidal calcium phosphate partially solubilizes as acidity increases. During fermentation of the milk, the pH gradually declines to around 4.5, and destabilized micelles aggregate into a 3-dimensional network in which whey is entrapped. Appearance of whey on the surface ("wheying-off") is due to syneresis.

In stirred-style yogurt, the 3-dimensional network is disturbed when fruit and flavors are mixed into the plain yogurt. Texture and physical properties of stirred-style yogurts is therefore determined by the fruit, stabilizer and rate of cooling in their manufacture.

Stabilizers are often added to prevent surface appearance of whey, as well as to improve and maintain body, texture, viscosity and mouthfeel. Examples of stabilizers include gelatin, whey protein concentrates ('WPC'), gums (e.g., locust bean gum, guar gum, carrageenan and xanthan), protein and starch, including modified starch. Yogurts having lower or reduced milk solids have a greater tendency to synerese; therefore, stabilizers are often added to such yogurts. Often a combination of stabilizers is added to the yogurt formulation to avoid defects that may result from the use of just one stabilizer.

Full protein yogurts typically contain about 3.3% to about 3.5% protein (whey and casein) in the starting milk, and around 8.2% dairy solids (protein, lactose, fat, etc). In many countries, a substantial portion of the population cannot afford yogurts such as those described above. Therefore, in order to make these yogurts more affordable, manufacturers often dilute the yogurt with water. However, this dilution is problematic in that, depending upon the degree of dilution, it reduces the amount of milk solids, which negatively affects the properties of the yogurt (e.g., viscosity, texture, mouthfeel, etc.). As noted above, the acid-casein interaction in the yogurt gives it its gel structure. Adding water to the overall formulation reduces the total amount of protein in the yogurt, resulting in a less viscous yogurt.

Certain additives such as powdered milk can be added to this diluted yogurt formulation to provide benefits such as texture and/or viscosity; however, use of these additives come at an increase in their cost of manufacture. Other additives such as gums or gelatin can be used to improve viscosity of the diluted formulation; however, use of these ingredients can result in a yogurt with an unpleasant mouthfeel as well as added cost of manufacture. Therefore, there is a need for texturizers and/or viscosifiers that can replace or supplement the added protein in powdered milk for these yogurts, thereby providing the organoleptic benefits provided in an undiluted formulation containing the full amount of protein, yet without a substantial increase in the cost of manufacture.

While yogurts with moderate or high levels of protein are well known, there is a demand, particularly in developing countries, for yogurts that have reduced protein levels (and thus reduced cost to manufacture) yet retain the texture characteristics (e.g., viscosity) and stability (e.g., against syneresis after seven weeks of storage) of full protein products.

SUMMARY OF THE INVENTION

Provided herewith is a low protein yogurt composition having the texture, viscosity and mouthfeel of a full protein yogurt. This yogurt composition comprises water, at least one dairy ingredient, and a crosslinked waxy starch. The waxy starch is crosslinked with a phosphate group (typically by reaction of a soluble phosphate selected from the group consisting of soluble metaphosphates and mixtures thereof with soluble polyphosphates) so that the crosslinked waxy starch has a peak Brabender viscosity of from about 600 to about 1500 Brabender units. This crosslinked waxy starch is present in the yogurt composition in an amount sufficient to add viscosity to the yogurt composition. The crosslinked waxy starch can further be stabilized by acetylation to obtain a longer shelf life.

Preferably, the crosslinked waxy starch has a bound phosphorus content of from about 0.003 weight percent to about 0.016 weight percent, based on weight of the waxy starch.

When the crosslinked waxy starch is stabilized by acetylation, the crosslinked waxy starch preferably has a bound acetyl group content of from about 2.0% to about 6.0%, based on weight of the crosslinked waxy starch.

The low protein yogurt composition preferably has a viscosity of about 5000 cP to about 6200 cP after seven weeks of refrigerated storage.

The crosslinked waxy starch is preferably present in the yogurt composition in an amount of from about 0.5% by weight to about 10.0% by weight of the low protein yogurt composition.

The present invention also provides a method of making a yogurt composition containing water, one or more dairy ingredients and a crosslinked waxy starch. The method includes mixing the crosslinked waxy starch with the dairy ingredient and water. The waxy starch is crosslinked with a phosphate group (typically by reaction of a soluble phosphate selected from the group consisting of soluble metaphosphates and mixtures thereof with soluble polyphosphates) so that the crosslinked waxy starch has a peak Brabender viscosity of from about 600 to about 1500 Brabender units. The crosslinked waxy starch is added to the yogurt composition in an amount sufficient to add viscosity to the yogurt composition. The crosslinked waxy starch can also be stabilized by acetylation to obtain a longer shelf life.

DETAILED DESCRIPTION OF THE INVENTION

For the purpose of the present invention, "yogurt" is defined as an acidified food product containing a dairy ingredient and having a gelled texture. Thus, the term yogurt includes acidified food products that meet a standard of identity for yogurt, as well as acidified food products that do not meet such a standard. While full protein yogurts typically contain about 3.3 to about 3.5% protein as noted above, for the purpose of the present invention, a "full protein yogurt" refers to a yogurt having a protein content of at least about 2.9% by weight of the yogurt. Accordingly, "low protein yogurt" as used in the present invention is a yogurt having a protein content of less than 2.9% by weight of the yogurt. In particular, low protein yogurts preferably have about 2.6% or less protein by weight of the yogurt. "Dairy ingredient" refers to a food product containing milk, one or more food products derived from milk, or dairy alternative ingredients derived from grain or plant sources (e.g., rice milk, soy milk, hemp milk, coconut milk, almond milk and peanut milk).

Low protein yogurts according to the present invention contain at least water, one or more dairy ingredients, and starch. Starches used in preparing the present invention can be derived from any native source. A native starch as used herein is one as found in nature. Typical native sources for starches used in the present invention are cereals (e.g., wheat, corn or maize, rice, oat, etc.), tubers and roots (e.g., potato and tapioca), legumes and fruits.

Also suitable are starches derived from a plant obtained by standard breeding techniques including crossbreeding, translocation, inversion, transformation, insertion, irradiation, chemical or other induced mutation, or any other method of gene or chromosome engineering to include variations thereof. In addition, starch derived from a plant grown from induced mutations and variations of the above generic composition which may be produced by known standard methods of mutation breeding are also suitable herein.

The starch can be any low amylose (waxy) variety, such as waxy corn, waxy potato, waxy sweet potato, waxy barley, waxy wheat, waxy rice, waxy sago, waxy amaranth, waxy tapioca, waxy arrowroot, waxy canna, waxy pea, waxy banana, waxy oat, waxy rye, waxy triticale, and waxy sorghum. Preferably, the waxy starch is waxy corn or waxy tapioca.

Low amylose or waxy starch refers to a starch or flour having about 10% or less amylose by weight of the starch granule. In one embodiment, the waxy starch contains about 5% or less amylose, more particularly, about 2% or less amylose, and even more particularly about 1% or less amylose by weight of the starch granule.

In addition to being a low amylose or waxy starch, the starch used in the low protein yogurts of the present invention is a modified starch. In one aspect, the waxy starch is modified by crosslinking with a food grade crosslinking reagent. Useful crosslinking reagents include phosphate-based crosslinking reagent such as a soluble metaphosphate (e.g., sodium trimetaphosphate, hereinafter STMP) or phosphorous oxychloride (hereinafter $POCl_3$). Preferably the crosslinking reagent is STMP. In one embodiment, the crosslinking reagent is a blend of STMP and sodium tripolyphosphate (STPP, the blend hereinafter referred to as STMP/STPP). STPP is a stabilizer that enhances crosslinking with STMP. The waxy starch is reacted with the crosslinking reagent for a time and at a temperature such that the resultant crosslinked waxy starch has a peak Brabender viscosity of from about 600 to about 1300 Brabender units. Crosslinking can be conducted using methods known in the art. The amount of crosslinking can vary depending upon the desired viscosity, but preferably the waxy starch is moderately to highly crosslinked.

When the crosslinking reagent is STMP, the starches are typically chemically modified by reacting the starch in the presence of water with STMP or STMP/STPP (typically under specific conditions of pH and temperature) to yield a crosslinked waxy starch. The STMP/STPP blend typically contains no more than a nominal amount by weight of STPP (e.g., no more than about 10%, and typically no more than about 5% of STPP). Generally, where the blend or mixture is used, it will typically comprise a ratio of from about 5:1 to about 2000:1 by weight STMP:STPP and more typically from about 25:1 to about 100:1 by weight STMP:STPP. The STMP/STPP blend is typically used at a level of from about 0.01% to about 2.0% by weight, more typically from about 0.05% to about 0.75% by weight, and even more typically from about 0.1% to about 0.3% by weight, based on weight of the starch. When STMP is used alone, the above ranges can also be used as the amount of STMP alone. When $POCl_3$ is used as the crosslinking agent, the amount will be adjusted to achieve the same degree of inhibition (as measured as the reduction in peak Brabender viscosity of the $POCl_3$ crosslinked starch) as is obtained by crosslinking the starch with STMP/STPP, as described above.

It will be appreciated by one of ordinary skill in the art that an increased level of crosslinking is generally obtained by use of increased amounts of crosslinking reagent. However, others factors such as length of time of reaction (longer time promotes crosslinking), pH of reaction medium (higher pH promotes crosslinking) and conditions of drying (longer time or higher drying temperatures promote crosslinking will also affect the level of degree of crosslinking, and thus, degree of inhibition, except when the reaction medium is neutralized or made mildly acidic (e.g., pH of 5 to 6), or the product starch is washed to a neutral pH before drying). Thus, it is important to choose crosslinking reaction parameters and drying conditions that result in modified starches having the peak viscosities prescribed above.

Without being bound by any particular theory, the use of typical reaction conditions described herein is believed to result in a level of bound phosphorous present in distarch phosphate linking groups that is effective in providing a crosslinked and stabilized waxy starch having a peak Brabender viscosity of from about 600 to about 1300 Brabender units.

The pH can be made basic (e.g., a pH of 11.5 to 12.0) using any food grade base that will not interfere with the reaction. In one embodiment, the base used is sodium hydroxide. The sodium hydroxide can be used at a level of at least about 0.4% to about 0.8%, based on starch weight, and in another from about 0.55% to about 0.65%, based on starch weight. In another embodiment, the base used is a concentrated base to reduce the dilution of the reaction mixture. In yet another embodiment, an at least 25% alkali solution is used, and in yet another embodiment, an at least 25% sodium hydroxide solution is used. In one embodiment, the percent solids of the reaction mixture is kept as high as practically possible without impeding the reaction or causing the starch to significantly swell.

The crosslinking reaction is allowed to proceed until the waxy starch product exhibits a peak Brabender viscosity within the range of from about 600 to about 1500 Brabender units, more typically from about 700 to about 1400 Brabender units and, preferably from about 800 to about 1300 Brabender units. Peak Brabender viscosity is measured according to the test described below. When the starch is waxy corn, the waxy corn starch product exhibits a peak Brabender viscosity within the range of from about 600 to about 1300 Brabender units, more preferably from about 700 to about 1200 Brabender units, and even more preferably from about 800 to about 1100 Brabender units. When the starch is waxy tapioca, the waxy tapioca starch product exhibits a peak Brabender viscosity within the range of from about 900 to about 1500 Brabender units, more preferably from about 1000 to about 1400 Brabender units, and even more preferably from about 1100 to about 1300 Brabender units.

In addition to crosslinking, the waxy starch can be further modified to obtain extended shelf-life, that is, the starch can be stabilized. In addition to or instead of stabilization using STPP as noted above, the starch can be stabilized by substitution with succinic anhydride, acetyl or hydroxypropyl groups. Preferably, the starch is substituted by acetylation. Acetylation adds acetyl groups to the crosslinked waxy starch, thereby inhibiting syneresis in the low protein yogurt. Stabilization of the starch can occur after crosslinking by making the pH of the reaction slurry mildly alkaline and then adding the stabilizing agent (e.g., acetic anhydride). The stabilizing agent can be added to the reaction slurry in an amount from about 0.5% to about 10.0%, preferably from about 0.75% to about 8.0%, and even more preferably from about 1.0% to about 7.0% by weight of the starch granule.

When the substitution reaction is acetylation, it needs to be carried out only for a time sufficient to provide the desired degree of stabilization—typically from about 5 minutes to about 3 hours, and preferably from about 10 to about 30 minutes. In one aspect, the treatment level (weight %) of acetic anhydride with the starch can range from about 1.0% to about 7%, preferably about 2.0% to about 6%, and more preferably from about 2.2% to about 4%, based on weight of the stabilized starch. The weight % of bound acetyl in the reaction starch product can range from about 0.1% to about 2.5%, preferably about 0.66% to about 2.43%, based on weight of the stabilized starch.

After the desired degree of acetylation is achieved, the pH of the reaction slurry is made mildly acidic, for example, from about pH 4 to about pH 6.5, preferably from about pH 5 to about pH 6, and more preferably from about pH 5.25 to about pH 5.75. The product can then be recovered from the reaction slurry (e.g., by filtration), washed with water, and then dried.

The composition of yogurt varies in different countries and in different localities and markets within each country. In formulating yogurts, consideration must be given to legal requirements, quality of product desired, raw materials available, plant equipment and processes, trade demands, competition and costs. For example, yogurt must contain not less than 3.25% milkfat and 8.25% milk solids-not-fat ('MSNF'). MSNF is typically comprised of lactose and protein (e.g., dairy proteins such as casein). Depending on the source of the milk, the lactose content in the MSNF can vary from about 4.6% for full-fat milk to about 5.1% for low-fat (skim) milk. If the yogurt is made from skim milk, the amount of protein required to keep the product as a yogurt by definition is 3.15%. For a full-fat milk source, the resultant yogurt would require 3.45% protein. Manufacturers often formulate above this amount to avoid falling below minimum amounts required per the definition above.

In contrast to full-protein yogurts, the present invention is directed towards yogurts having reduced levels of proteins. Based on the definition of full-protein yogurts having a minimum of 3.25% milkfat and 8.25% MSNF, typical low protein yogurts of the set or stirred type will have about 3.25% or less by weight protein, and more typically about 3.0% or less by weight protein. However, for the purpose of the present invention, a "full protein" yogurt is one having at least 2.9% protein by weight. Stabilizers are available that provide the viscosity needed in a yogurt having only 2.9% protein. The present invention addresses the manufacturing need for a stabilizer or texturizer that gives yogurts having less than 2.9% protein the same viscosity and mouthfeel of a full protein yogurt without a substantial increase in the cost of manufacture.

Low protein yogurts are generally formulated and manufactured in a manner similar to full protein yogurts with the exception that they are further diluted with water in order to reduce their cost of manufacture. This water can be added in an amount of about 10.0% to about 12.0% by weight of the yogurt composition in order to dilute the composition. This addition of water to the formulation reduces the overall protein content of the yogurt, thereby negatively affecting the properties of the low protein yogurt. In order to obtain a low protein yogurt having textural and viscosity characteristics similar to a full protein yogurt, the low protein yogurt of the present invention includes at least a modified waxy starch in its formulation. As such, low protein yogurt formulations according to the present invention include at least added water (i.e., water in addition to that normally present in the dairy ingredient), one or more dairy ingredients, and the modified waxy starch, wherein the modified starch is at least crosslinked. Other ingredients such as sweeteners and flavoring can optionally be added depending upon the end low protein yogurt product desired. Further, the selection of the one or more dairy ingredients used in the formulation can result in a full fat, low fat or no fat yogurt formulation. The yogurt base, before addition of bulky flavors and/or sweeteners, typically contains about 0.1% to about 4% milkfat and at least about 1% milk-solids-not-fat ("MSNF"), more typically at least about 8.25% MSNF, and typically has a titratable acidity of at least about 0.9%, expressed as lactic acid.

As noted above, the low protein yogurt of the present invention contains a viscosifying amount of a crosslinked waxy starch in an amount sufficient to impart to the yogurt a desired viscosity of from about 5000 cP to about 6200 cP after seven weeks. The yogurt base typically contains about 10% or less by weight of the crosslinked waxy starch (e.g., from about 0.5% to about 10% by weight of the low protein yogurt composition). Preferably, the low protein yogurt formulation contains from about 1.0% to about 8.0% by weight, more preferably about 1.5% to 7.0% by weight, and even more preferably about 2.0% to about 6.0% of the crosslinked waxy starch by weight of the yogurt formulation.

In one embodiment, the yogurt only contains the crosslinked waxy starch as the sole viscosifying agent (other than any dairy protein that may be present). Optionally, or in another embodiment, the yogurt base can additionally comprise modest amounts of additional stabilizers. Useful optional stabilizers include gelatin, gum acacia, carrageenan, gum karaya, pectin, gum Tragacanth, xanthan, maltodextrins, and mixtures thereof. The precise levels of use for the gums depend upon a variety of factors. Most importantly, supplemental stabilizer selection and usage level is dependent upon the filling viscosity range for the yogurt as described in detail below. These supplemental stabilizers are well known food ingredients and are commercially available.

Low protein yogurts according to the present invention can further be stabilized (e.g., against syneresis) for an extended period of refrigerated storage, typically for at least about seven weeks of storage at refrigerated temperatures. Stabilization can be achieved by the type of starch used or by modifying the degree of stabilization of the starch.

The low protein yogurt formulation can optionally also contain one or more nutritive carbohydrate sweetening agents. Exemplary useful nutritive carbohydrate sweetening agents include, but are not limited to, sucrose, high fructose corn syrup, dextrose, various DE corn syrups, beet or cane sugar; invert sugar (in paste or syrup form); brown sugar, refiner's syrup; molasses (other than blackstrap); fructose; fructose syrup; maltose; maltose syrup, dried maltose syrup; malt extract, dried malt extract; malt syrup, dried malt syrup, honey; maple sugar, except table syrup and mixtures thereof.

The low protein yogurt is prepared by adding—typically pre-blended—the various dry ingredients to the wet ingredients, and blending them together to form the yogurt base. This base can then optionally be deaerated and homogenized. After blending, deaerating, heating and homogenizing, the present low protein yogurt can be pasteurized and then rapidly cooled to culturation temperatures.

Once cooled, the pasteurized low protein yogurt formulation is culturated. This culturing step can include the two sub-steps of inoculation—or adding a live yogurt culture to form an inoculated yogurt base—and then fermenting or incubating the inoculated yogurt base. For good results, about 0.02% to about 0.06%, preferably about (0.02% to about 0.05%, of yogurt culture is added to form the yogurt.

The inoculated low protein yogurt base formulation is then incubated to allow the live yogurt culture to ferment and form the yogurt. The incubation period for yogurt ranges from about 3 to about 10 hours at temperatures of about 38° C. to about 46° C. (about 100° F. to about 115° F.). Fermentation must be quiescent (lack of agitation and vibrations) to avoid phase separation in the yogurt base following incubation. Fermentation progress is monitored by pH measurements at regular intervals until the desired final acidity is obtained.

As an alternative to culturing, the yogurt base can be directly acidified by addition of a food grade acid, typically to a pH of from about 4.1 to about 4.7. Food grade acids include lactic acid, citric acid, malic acid, gamma delta lactone, tartaric acid, acetic acid, or any other food grade acid, or combinations thereof.

Once incubated, the yogurt is then typically mixed/sheared to form a stirred style yogurt. Mixing can be performed either partially or fully, either before or after a cooling arrest step. Mixing blends the yogurt to impart a smooth texture and mouthfeel to the yogurt body. This mixing step can also optionally include the addition of a high potency sweetener (e.g., aspartame, acesulfame K, sucralose, saccharine, cyclamate, and mixtures thereof, in their soluble salt forms) to the formulation.

When the targeted acidity level is reached, the yogurt culture growth is arrested b cooling the yogurt. The targeted acidity level is at a pH from about pH 4.3 to about pH 4.9, at which level fermentation is terminated by cooling, typically to a temperature of about 21° C. (70° F.) or less, preferably about 3° C. to about 16° C. (about 38° F. to about 60° F.), and more preferably about 4.5° C. (about 40° F.).

In an optional embodiment, the cooled yogurt can be blended thereafter (i.e., without resting) with additives such as fruit and/or fruit puree, colorants, flavorants, high potency sweeteners (e.g., aspartame, acesulfame, sucralose, saccharine, cyclamate and mixtures thereof, in the salts), vitamins, minerals, especially calcium salts (e.g., tricalcium phosphate and/or other dispersible calcium salts). Alternatively, fruit and or fruit puree or preserves can be added to a container before addition of the yogurt when preparing a product having fruit on the bottom.

Conventionally, the low protein yogurt is unaerated. Thus, the yogurt phase(s) will typically have a density of from about 0.9 to about 1.2 g/cc.

In certain embodiments of the present invention, the stirred style low protein yogurt can additionally comprise about 0.1% to about 25% of fruit preserves dispersed throughout the yogurt phase. The term "yogurt phase" is used herein broadly to include both the yogurt alone (i.e., with non-fruit additives dispersed or dissolved in the yogurt) or the yogurt (with other additives) mixed with fruit puree.

The resultant low protein yogurt is stored at conventional refrigerator temperatures, generally at a temperature of about 0° C. to about 15° C., and typically about 0° C. to about 5° C.

The invention will be illustrated by the following examples which should not be construed to limit the invention. All amounts, parts and percentages in the specification and claims are by weight, unless noted otherwise in context.

EXAMPLES

Materials and Methods—
Preparation of Crosslinked Waxy Corn—
Waxy corn starch was crosslinked with sodium trimetaphosphate (STMP) according to the following process. A room temperature slurry was prepared by suspending 1000 grams of waxy corn starch in tap water (1500 mL). Sodium chloride (0.5% on starch, 5 gm) and calcium chloride dihydrate (0.1% on starch, 1 gm) were added with stirring. Alkalinity was then increased by addition of NaOH (0.6% on starch as 200 gm of a 3% NaOH solution). Then 12.5 gm STMP (0.125 wt % based on the starch weight) was added and the slurry mixed for 6 hours. The pH of the starch slurry was then adjusted to 5.5 by addition of hydrochloric acid (HCl, 25 wt %). The starch product was recovered by filtration, washed with water, and air-dried.

Preparation of Crosslinked and Stabilized Waxy Corn—

Waxy corn starch was crosslinked with sodium trimetaphosphate (STMP) and then stabilized with acetic anhydride according to the following process. A room temperature slurry was prepared by suspending 1000 g of waxy corn starch in 1500 mL of tap water. Sodium chloride (0.5% on starch, 5 gm) and calcium chloride dihydrate (0.1% on starch, 1 gm) were added with stirring. Alkalinity was then increased by addition of NaOH (0.6% on starch as 200 gm of a 3% NaOH solution). Then STMP (in a wt % shown below based on the starch weight) was added and this slurry was mixed for 6 hours. The pH was then decreased to 7.8-8.2 using sulfuric acid (25 wt %). Then acetic anhydride (AA— in a wt % shown below based on the starch weight) was then added while the pH was controlled at 7.7 to 8.2. After mixing for 15 minutes, the pH of the starch slurry was then adjusted to 5.5 by addition of hydrochloric acid (25 wt %). The starch product was recovered by filtration, washed with water, and air-dried.

Preparation of Crosslinked Waxy Tapioca—

Waxy tapioca starch was crosslinked with sodium trimetaphosphate (MVP) according to the following process. A room temperature slurry was prepared by suspending 1000 grams of waxy tapioca starch in tap water (1500 mL). Sodium chloride (0.5% on starch, 3 to 6 gm) and calcium chloride dihydrate (0.1% on starch, 1 to 6 gm) were added to the slurry with stirring. Alkalinity was then increased by addition of dilute NaOH (0.6% on starch as 200 gm of a 3% NaOH solution) to a pH greater than 11.3. Then 1.4 to 2.1 gm STMP (0.125 wt % based on the starch weight) was added and the slurry mixed for 3 to 8 hours. The pH of the starch slurry was then adjusted to 5.5 by addition of dilute hydrochloric acid (HCl, 25 wt %). The starch product was recovered by filtration, washed with water, and air-dried.

Measurement of Starch Viscosity by Brabender Evaluation—

Characterization of a crosslinked starch can be determined by reference to a measurement of its viscosity after it is dispersed in water and gelatinized. An instrument used to measure this viscosity is the Micro Visco-Amylo-Graph® (available from C.W. Brabender Instruments, Inc., South Hackensack, N.J., USA). The Micro Visco-Amylo-Graph® records the torque required to balance the viscosity that develops when the starch slurry is subjected to a programmed heating cycle. The record consists of a curve tracing the viscosity through the heating cycle in units of measurement termed Brabender Units (BU).

Viscosity is measured using a Micro Visco-Amylo-Graph® (available from C.W. Brabender Instruments, Inc., South Hackensack, N.J., USA). 6.6 g of anhydrous starch is slurried in 103.4 g of pH 6 buffer and then added to the Brabender viscoamylograph bowl. The starch slurry is rapidly heated to 50° C. and then heated further from 50° C. to 95° C. at a heating rate of 8° C. per minute and then held at 95° C. for 5 minutes. The peak viscosity is reported.

Yogurt Formulations—

Yogurts were prepared using the formulations set forth in Table 1 below. The specific starch ingredient used in formulating the yogurt compositions is described in each of the Examples below.

TABLE 1

| Ingredient | Full Protein Control (wt %) | Low Protein Control (wt %) | Numbered Examples (wt %) | Numbered Examples w/ Gelatin (wt %) |
|---|---|---|---|---|
| Water | 10.380 | 11.480 | 11.480 | 11.200 |
| Skim milk | 70.000 | 70.000 | 70.000 | 70.00 |
| Heavy Cream | 6.200 | 6.200 | 6.200 | 6.200 |
| NFDM | 1.400 | 0.300 | 0.300 | 0.300 |
| Sucrose | 10.000 | 10.000 | 10.000 | 10.000 |
| HERMTEX ® starch | 2.000 | 2.000 | 0 | 0 |
| STMP or STMP/AA Starch | 0 | 0 | 2.000 | 2.000 |
| Gelatin | 0 | 0 | 0 | 0.300 |
| Total | 100.000 | 100.000 | 100.000 | 100.000 |
| Protein Content | 2.920 | 2.540 | 2.540 | 2.810 |
| Fat Fat Content | 2.520 | 2.520 | 2.520 | 2.520 |

*THERMTEX ® starch is a phosphorous oxychloride (POCl$_3$) crosslinked, propylene oxide (PO) stabilized waxy maize starch available from Ingredion Incorporated, Bridgewater, New Jersey, USA.

Stirred Yogurt Production—

Stirred yogurts were prepared in the following manner. The dry ingredients were blended together and then added to the one or more dairy ingredients and water and mixed together in a Breddo Likwifier blender for about 15 minutes at about 500 RPMs, and then mixed for about 15 minutes using a Lightnin Mixer (available from SPC Corporation, Rochester, N.Y., USA) on medium agitation. The mixture was then transferred from the Lightnin Mixer to a holding tank, and then processed through MicroThermics® HVHW High-Temperature Short-Time processing equipment (Model 25-2S, available from MicroThermics, Inc., Raleigh, N.C., USA). In the upstream process, the mixture was homogenized at 65° C. and 1.50 Bar, and then pasteurized at 90° C. The mixture was then cooled to an inoculation temperature of 40° C.+/−2° C. and inoculated with 0.2% diluted culture of Lactobacillus acidophilus (available as Yo-Fast 16 Yogurt Culture from Chr. Hansen Holding A/S, Bøge Allé 10-12, 2970 Høsholm, Denmark) with 50 grams of culture plus 450 grams of warm mix taken from the High-Temperature Short-Time processing equipment for a 1:10 dilution. The inoculated mixture was incubated for about 3 to 4 hours at 40° C. to reach a target pH of 4.6. The mixture was pumped using a stator pump through a #60 mesh screen and cooling system of the High-Temperature Short-Time processing equipment. Samples of the finished low protein yogurt products were collected in 4 oz. cups and cooled to 4° C., and evaluated at 1, 3 and 6 weeks for gel strength and viscosity.

Yogurt Viscosity Measurement—

Viscosity of yogurt samples was measured using a Brookfield Model DV-II+ Viscometer (available from Brookfield Engineering Laboratories, Inc., Middleboro, Mass., USA) with a small sample adaptor and the following parameters:

Spindle #28, 30 RPM, 20 Seconds, 12 g sample—output in centipoise (cP).

Samples were as close to approximately 4° C. as possible.

Example 1

Wary corn starch crosslinked with STMP (i.e., not acetylated) was made by the procedure set forth above. It had a swelling volume of 22 ml/g and a peak Brabender viscosity of 926 and was designated as Starch 1. A low protein yogurt having a protein content of 2.5% and containing the crosslinked waxy starch was produced as described above. This protein was evaluated for stability against a yogurt containing THERMTEX® starch (Control Starch) at 2.9% (full) protein. Stability of the experimental low protein yogurt was very acceptable after 3 weeks of shelf life, but exhibited syneresis beginning at 4 weeks and progressing over 7 weeks of refrigerated storage at 4° C. In contrast, the full protein control yogurt containing THERMTEX® showed no syneresis after 4 weeks of shelf life.

Examples 2-4 and Comparative Examples B, C, and D

A series of STMP crosslinked and stabilized (acetylated) starches were prepared according to the procedure described above with crosslinking agent and stabilizer in the amount set forth in Table 2 below. Their peak viscosities are also provided in Table 2—

TABLE 2

| Starch | STMP (wt %) | AA (wt %) | Brabender Viscosity (BU) | Bound P (wt %) | Bound Acetyl (wt %) |
|---|---|---|---|---|---|
| A | 1.03 | 1.2 | 229 | 0.013 | 0.39 |
| B | 1.03 | 2.0 | 237 | 0.023 | 0.77 |
| 2 | 0.75 | 1.2 | 850 | 0.009 | 0.37 |
| 3 | 0.75 | 2.0 | 861 | 0.011 | 0.66 |
| 4 | 0.5 | 6.0 | 1087 | 0.009 | 2.10 |
| 5 | 0.15 | 7.0 | 836 | 0.004 | 2.43 |
| 6 | 0.12 | 6.8 | 1079 | 0.003 | 2.30 |

Yogurts were made according to the formula set forth in Table 1 using the starches described in Table 2 above and had the viscosities shown in Table 3 below.

TABLE 3

| Example Number | Starch | Yogurt Viscosity (cP) @ 7 weeks |
|---|---|---|
| B | (Control [1] w/ full protein) | 4774.5 |
| C | A | 3358 |
| D | B | 4691.5 |
| 2 | 2 | 5108 |
| 3 | 3 | 5466.5 |
| 4 | 4 | 5108 |

[1] The control starch was THERMTEX® starch.

The reduced protein yogurts containing the experimental starches exhibited maintenance of key attributes—good visual appearance, full mouthfeel, lack of syneresis and high viscosity comparable to a full protein 2.9% THERMTEX® starch control. Two of the samples—yogurts containing Starch Numbers 3 and 4—performed best having higher viscosity, full mouthfeel and lack of graininess. The shelf fife study was run to completion indicating the samples maintained acceptable attributes over seven weeks of storage.

Examples 5 and 6 and Comparative Examples E and F

A replicate set of yogurt samples was produced with the two best performing experimental starches from the previous experiment—Starch Number 3 and 4. These yogurt compositions were compared against a full protein (2.9%) yogurt composition containing THERMTEX® starch (positive control) and a low protein (2.5%) yogurt composition containing THERMTEX® starch (negative control). Viscosity results are shown in Table 4 below.

TABLE 4

| Example Number | Starch | Yogurt Viscosity (cP) @ 7 weeks |
|---|---|---|
| E | (Control w/ full protein) | 6066.5 |
| F | (Control w/ low protein) | 5266.5 |
| 5 | 3 | 5125 |
| 6 | 4 | 5591 |

The yogurt Samples were also evaluated by sensory descriptive profiling. The protocol used was as follows—

Sensory/Descriptive Analysis Protocol:
  n=9 highly trained panelists
  Serving size=one 4 oz. cup of yogurt
  1 replication; randomized; complete block design
  All products were evaluated by panelists trained in a 15 point universal intensity scale of foods. Data was collected using CompuSense software.
  Products were evaluated for texture and flavor attributes as listed below:

Texture (Pre-Consumption):
1. Surface Shine
2. Surface Grain (on container)
3. Spoon Indentation
4. Jiggle
5. Surface Grain (on spoon)

Texture (in Mouth):
1. Firmness (before stir)
2. Viscosity
3. Rate of Flow
4. Firmness (after stir)
5. Thickness in mouth
6. Cohesiveness
7. Evenness of mouthcoating
8. Slipperiness
9. Chalkiness/powderiness in the mouth
10. Meltaway Residual Texture (Immediate):
1. Total residual mouthcoat
2. Residual chalky mouthcoating Panelists rated the intensity of these texture attributes on a 15-point intensity scale using the references provided. Clearing time between samples was 3 minutes to rest palates and prevent fatigue. Clearing agents were filtered water at ambient temperature and unsalted crackers. After completion of the qualitative evaluation, the panelists were asked to qualitatively describe the differences between the select samples.

Results—

The following attributes were selected to define the textural attributes of the product: Spoon Indentation, Viscosity, Rate of Flow, Thickness in the Mouth, Cohesiveness and Evenness of Mouthcoating. From Table 4, full protein yogurts containing THERMTEX® starch (positive control) and low protein yogurts containing Starch Number 3 were similar, whereas low protein yogurts containing THERMTEX® starch and low protein yogurts containing Starch Number 4 were similar. In other words, the lower level of acetyl stabilization does not create the unique benefit of replacing the textural attributes of protein. A higher level of acetyl stabilization is needed. Therefore, it was discovered that a medium level of STMP crosslinking and high acetyl stabilization is needed in a low protein (2.5%) yogurt to match the textural attributes of a full protein (2.9%) yogurt.

Examples 7 and 8 and Comparative Examples G and H

Two additional starches having a medium level of STMP crosslinking and high acetyl stabilization were prepared and had the properties shown in Table 5 below.

TABLE 5

| Starch | Brabender Viscosity (BU) | Bound Acetyl (wt %) |
|--------|---------------------------|---------------------|
| 5 | 836 | 2.43 |
| 6 | 1078 | 2.30 |

Yogurt compositions were prepared with these starches and compared to a full protein positive control yogurt (Example G) and a low protein negative control yogurt prepared with THERMTEX® starch (Example H). The results are provided in Table 6 below.

TABLE 6

| Example No. | Starch | Yogurt Viscosity (cP) @ 7 weeks |
|-------------|--------|----------------------------------|
| G | (Control w/ full protein) | 5058 |
| H | (Control w/ low protein) | 4549.5 |
| 7 | 5 | 5524.5 |
| 8 | 6 | 5741.5 |

Results showed good visual yogurt appearance (lack of graininess), full mouthfeel, lack of syneresis and high peak viscosity in yogurts prepared with STMP crosslinked and acetylated (stabilized) starches (Starch Numbers 5 and 6) over 7 weeks of shelf life compared to the full protein (2.9%) yogurt prepared with THERMTEX® starch (positive control).

Example 9 and Comparative Examples I and J

Waxy corn starch crosslinked with STMP and acetylated as described above was prepared. It had a Brabender viscosity of 874 and 2.3 wt % bound acetyl groups and is designated as Starch 7. A comparative dent corn starch non-waxy) crosslinked with STMP and stabilized with 4.5% acetic anhydride (commercially available as NATIONAL ° 4013, from Ingredion Incorporated, Bridgewater, N.J.) and having a Brabender peak viscosity of 208 was obtained for use and is designated as Starch C. These two starches were compared to a full protein positive control with THERMTEX® starch and the results (averages of duplicate examples) are shown in Table 7 below.

TABLE 7

| Example No. | Starch | Yogurt Viscosity (cP) @ 7 weeks |
|-------------|--------|----------------------------------|
| I | (Control w/ full protein) | 5057.75 |
| 9 | 7 | 4870.50 |
| J | C | 2654.25 |

It can be seen from the above that yogurt containing Starch 7 had a viscosity comparable to the full protein control yogurt, while the yogurt containing Starch C had a severely reduced and unacceptable viscosity. Further, the mouthfeel of the yogurt containing Starch C was thin and not comparable to the thick mouthfeel of the yogurts Example I and Example 9.

Example 10-13

Waxy corn starch crosslinked with STMP (i.e., not stabilized) was made by the procedure set forth above. It had a peak Brabender viscosity of 1117 and is designated as Starch 8 in Table 8 below. Waxy tapioca starch crosslinked with STMP (i.e., not stabilized) was made by the procedure sat forth above and had a Brabender peak viscosity of 1252 and is designated as Starch 9. These two starches were compared to each other in reduced protein yogurt formulations with and without gelatin. The results (averages of duplicate examples) are shown in Table 8 below.

TABLE 8

| Example No. | Starch | Contains Gelatin | Yogurt Viscosity (cP) @ 1 week | Yogurt Viscosity (cP) @ 7 week |
|-------------|--------|------------------|-------------------------------|-------------------------------|
| 10 | 8 | No | 5233 | 5150 |
| 11 | 9 | No | 4641.5 | 4608 |
| 12 | 8 | Yes | 6591.5 | 6241.5 |
| 13 | 9 | Yes | 7292 | 7016.5 |

It can be seen from the above that yogurt prepared with Starch 8 (waxy corn) had a viscosity comparable to or slightly lower than the yogurt prepared with Starch 9 (waxy cassava) when prepared with gelatin (Example 12 and 13) and without (Example 10 and 11). However, the mouthfeel of the yogurt prepared with Starch 8 had a corn note in the aftertaste which was not observed in the yogurts prepared with Starch 9, which had an observed cleaner flavor. Further, yogurts containing Starch 8 showed syneresis beginning at 4 weeks and progressing over 7 weeks of refrigerated storage at 4° C., whereas yogurts containing Starch 9 showed no syneresis over the 7 week shelf life study.

The above description is for the purpose of teaching the person of ordinary skill in the art how to practice the present invention, and it is not intended to detail all those obvious modifications and variations which will become apparent to the skilled worker upon reading the description. It is intended, however, that all such obvious modifications and variations be included within the scope of the present invention which is defined by the following claims.

What is claimed is:

1. A low protein yogurt composition comprising:
water,
a dairy ingredient, and a crosslinked waxy starch selected from the group consisting of crosslinked acetyl-stabilized waxy corn starch and crosslinked waxy tapioca starch in an amount between 0.5% and 10% by weight of the composition wherein the waxy starch is crosslinked with sodium trimetaphosphate, has a bound phosphorous content of from 0.003% to 0.016% by weight of the starch, and has a peak Brabender viscosity of from about 600 to about 1500 Brabender units wherein peak viscosity is the highest viscosity during the following time and temperature course: heat a 6% solids in water slurry, buffered at 6 pH, rapidly to 50° C., increase from 50° to 95° C. at a rate of 8° C. per minute, and hold at 95° C. form 5 minutes, wherein the yogurt has a viscosity of about 5000 cP to about 6200 cP after seven weeks' storage; and wherein the low protein yogurt composition has less than 2.9% protein by weight of the composition.

2. The low protein yogurt composition of claim 1 wherein crosslinked modified waxy starch is the crosslinked stabilized waxy corn starch and has a peak Brabender viscosity of from about 700 to about 1200 Brabender units.

3. The low protein yogurt composition of claim 1 wherein the crosslinked waxy starch is the crosslinked stabilized waxy corn starch and has a peak Brabender viscosity of from about 800 to about 1100 Brabender units.

4. The low protein yogurt composition of claim 1 wherein the the crosslinked waxy starch is the waxy tapioca starch and has a peak Brabender viscosity of from about 1000 to about 1400 Brabender units.

5. The low protein yogurt composition of claim 1 wherein the crosslinked starch is the crosslinked waxy tapioca starch and has a peak Brabender viscosity of from about 1100 to about 1300 Brabender units.

6. The low protein yogurt composition according to claim 1, wherein the crosslinked stabilized waxy corn starch has a bound acetyl group content of about 2.0% to 6.0%, based on weight of the crosslinked stabilized waxy starch.

7. A method of making a low protein yogurt composition comprising:

mixing between 0.5% to 10% by weight of a crosslinked waxy starch selected from the group consisting of crosslinked acetyl-stabilized waxy corn starch and crosslinked waxy tapioca starch with at least one dairy ingredient and water, and culturing the mixture, wherein the crosslinked stabilized waxy starch is crosslinked with sodium trimetaphosphate for a time and at a temperature sufficient so that the resultant crosslinked waxy starch has a bound phosphorous content of from 0.003% and 0.016% by weight of the waxy starch and has a peak Brabender viscosity of from about 600 to about 1500 Brabender units wherein peak viscosity is the highest viscosity during the following time and temperature course: heat a 6% solids in water slurry, buffered at 6 pH, rapidly to 50° C., increase from 50° to 95° C. at a rate of 8° C. per minute, and hold at 95° C. form 5 minutes, and wherein the dairy ingredient and water are mixed such that the yogurt composition has less than 2.9% protein by weight.

8. The method according to claim 7, wherein sufficient amount of the crosslinked acetyl-stabilized waxy corn starch or crosslinked waxy cassava starch is added such that the low protein yogurt composition has a viscosity of about 5000 cP to about 6200 cP after seven weeks of storage.

9. The method according to claim 7 wherein the crosslinked stabilized waxy corn starch has a bound acetyl group content of between 2.0% to 6.0%, based on weight of the starch.

* * * * *